United States Patent
Okada (10) Patent No.: US 11,212,477 B2
(45) Date of Patent: Dec. 28, 2021

(54) IMAGE PROCESSING DEVICE, IMAGE PROCESSING METHOD, AND IMAGE PROCESSING SYSTEM

(71) Applicant: SONY SEMICONDUCTOR SOLUTIONS CORPORATION, Kanagawa (JP)

(72) Inventor: Chihiro Okada, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/978,379

(22) PCT Filed: Jan. 23, 2019

(86) PCT No.: PCT/JP2019/002080
§ 371 (c)(1),
(2) Date: Sep. 4, 2020

(87) PCT Pub. No.: WO2019/176309
PCT Pub. Date: Sep. 19, 2019

(65) Prior Publication Data
US 2021/0044773 A1 Feb. 11, 2021

(30) Foreign Application Priority Data
Mar. 13, 2018 (JP) .............................. JP2018-045331

(51) Int. Cl.
*H04N 5/235* (2006.01)
*H04N 5/378* (2011.01)
(Continued)

(52) U.S. Cl.
CPC ............. *H04N 5/378* (2013.01); *H04N 5/343* (2013.01); *H04N 5/347* (2013.01)

(58) Field of Classification Search
CPC ........ H04N 5/378; H04N 5/343; H04N 5/347; H04N 5/3452; H04N 5/379; H04N 5/232;
(Continued)

(56) References Cited

U.S. PATENT DOCUMENTS

2010/0271526 A1 10/2010 Okuzaki et al.
2012/0236187 A1* 9/2012 Guthrie .................. H04N 5/347
348/273
(Continued)

FOREIGN PATENT DOCUMENTS

CN 101873443 A 10/2010
CN 105144692 A 12/2015
(Continued)

OTHER PUBLICATIONS

International Search Report and Written Opinion of PCT Application No. PCT/JP2019/002080, dated Apr. 16, 2019, 08 pages of ISRWO.

*Primary Examiner* — Kelly L Jerabek
(74) *Attorney, Agent, or Firm* — Chip Law Group (57) ABSTRACT

To prevent generation of an invalid frame while suppressing power consumption. An image processing device including an ADC unit including a plurality of ADCs configured to convert a pixel signal read from an image sensor from an analog format to a digital format, and a selection unit configured to select the number of used ADCs, which is the number of ADCs used, among the plurality of ADCs on the basis of a decimation rate of pixels in reading of the pixel signal from the image sensor, in which the number of used ADCs and the decimation rate are switched such that a product of the number of used ADCs and the decimation rate is maintained to be a constant state.

5 Claims, 6 Drawing Sheets

(51) Int. Cl.
*H04N 5/343* (2011.01)
*H04N 5/347* (2011.01)

(58) Field of Classification Search
CPC ............. H04N 5/3456; H04N 5/37455; H04N 5/3745; H03M 1/12
See application file for complete search history.

(56) References Cited

U.S. PATENT DOCUMENTS

2012/0307119 A1* 12/2012 Nakaseko ............ H04N 5/3765
 348/302
2014/0232932 A1 8/2014 Likamwa et al.

FOREIGN PATENT DOCUMENTS

| | | |
|---|---|---|
| JP | 2002-252809 A | 9/2002 |
| JP | 2007-104241 A | 4/2007 |
| JP | 2010-130492 A | 6/2010 |
| JP | 2010-258828 A | 11/2010 |
| JP | 2013-055589 A | 3/2013 |
| KR | 10-2015-0119916 A | 10/2015 |
| WO | 2014/130346 A2 | 8/2014 |

* cited by examiner

IMAGE PROCESSING DEVICE, IMAGE PROCESSING METHOD, AND IMAGE PROCESSING SYSTEM

CROSS REFERENCE TO RELATED APPLICATIONS

This application is a U.S. National Phase of International Patent Application No. PCT/JP2019/002080 filed on Jan. 23, 2019, which claims priority benefit of Japanese Patent Application No. JP 2018-045331 filed in the Japan Patent Office on Mar. 13, 2018. Each of the above-referenced applications is hereby incorporated herein by reference in its entirety.

TECHNICAL FIELD

The present disclosure relates to an image processing device, an image processing method, and an image processing system.

BACKGROUND ART

In recent years, various types of imaging devices have been developed. The imaging devices are roughly classified into a charge-transfer type imaging device a typical example of which is a charge coupled device (CCD) image sensor and a MOS type imaging device a typical example of which is a complementary metal oxide semiconductor (CMOS) image sensor. Then, for example, the CMOS image sensor is particularly mounted and used in mobile products such as mobile phones including a smartphone, and a camera.

In the CMOS image sensor, switching operation of an analog-to-digital converter (ADC) that converts a signal of each pixel read on the basis of shutter operation and read operation from an analog format to a digital format is performed according to various use cases of a user. Patent Document 1 discloses a technology related to image processing in which a signal is read from each pixel and a plurality of ADCs converts the pixel signal that has been read from an analog format to a digital format. For example, in some CMOS image sensors, there are a technology of using an ADC that consumes a large amount of power and converts a pixel signal of each pixel that has been read at high speed and high resolution, a technology of using an ADC that reduces power consumption by lowering speed and resolution and converts a pixel signal that has been read, and the like. In mobile products such as mobile phones including a smartphone and a camera that use a plurality of ADCs, operable time can be maximized and high speed and high image quality are realized by switching operation ranging from shutter operation to operation of the ADCs that convert a pixel signal, according to the use case.

However, when switching ADC operation, inclination of the shutter operation and inclination of read operation in the image sensor cannot be kept constant, and therefore charge accumulation time by each pixel from the shutter operation to start of the read operation in each pixel is not constant within one frame forming one captured image. A frame with a non-constant accumulation time is considered an invalid frame and is not used for display.

Various technologies have been developed to prevent generation of such an invalid frame. For example, there is disclosed a method in which even though inclinations of shutter operation and read operation are different between different types of ADCs; however, accumulation time is limited, and therefore the accumulation time is constant within one frame.

Furthermore, Patent Document 2 discloses a technique of correcting accumulation time and outputting a signal in a case where the accumulation time within one frame is not constant. Moreover, Patent Document 3 discloses a technique of partially decimating a horizontal synchronization signal to make shutter operation and read operation have same inclination, in the process of performing the shutter operation and the read operation and converting a pixel signal that has been read by an ADC.

CITATION LIST

Patent Document

Patent Document 1: Japanese Patent Application Laid-Open No. 2013-55589
Patent Document 2: Japanese Patent Application Laid-Open No. 2010-130492
Patent Document 3: Japanese Patent Application Laid-Open No. 2007-104241

SUMMARY OF THE INVENTION

Problems to be Solved by the Invention

However, in the technologies described above, the accumulation time is limited, a new correction mechanism is required, and a step is generated within one frame in a case where correction is insufficient. Furthermore, in the technology disclosed in Patent Document 3, although the accumulation time is guaranteed, the effect is limited in realizing low power consumption.

In view of the circumstances described above, it is desirable to prevent generation of an invalid frame while suppressing power consumption.

Solution to Problems

According to the present disclosure, there is provided an image processing device including an ADC unit including a plurality of ADCs configured to convert a pixel signal read from an image sensor from an analog format to a digital format, and a selection unit configured to select the number of used ADCs, which is the number of ADCs used among the plurality of ADCs, on the basis of a decimation rate of pixels in reading the pixel signal from the image sensor, in which the number of used ADCs and the decimation rate are switched such that a product of the number of used ADCs and the decimation rate is maintained to be a constant state.

In the image sensor, shutter operation for sweeping out a pixel signal accumulated and read operation of reading the pixel signal accumulated may be performed for each frame of an image, and before the shutter operation is performed, a first register, which is parameter information used in a first ADC mode, and a second register, which is parameter information used in a second ADC mode, may be set, the first ADC mode and the second ADC mode differing from each other in the number of used ADCs and the decimation rate.

The first register and the second register may be set before a vertical synchronization signal given before the shutter operation for which switching between the first ADC mode and the second ADC mode is performed is started.

Furthermore, according to the present disclosure, there is provided an image processing method including converting, by a processor, a pixel signal read from an image sensor from an analog format to a digital format by using a plurality of ADCs, and selecting, by the processor, the number of used ADCs, which is the number of ADCs used among the plurality of ADCs on the basis of a decimation rate of pixels in reading the pixel signal from the image sensor, in which the number of used ADCs and the decimation rate are switched such that the product of the number of used ADCs and the decimation rate is maintained to be a constant state.

Moreover, according to the present disclosure, there is provided a program causing a computer to function as an ADC unit including a plurality of ADCs configured to convert a pixel signal read from an image sensor from an analog format to a digital format, and a selection unit configured to select the number of used ADCs, which is the number of ADCs used among the plurality of ADCs on the basis of a decimation rate of pixels in reading the pixel signal from the image sensor, the program further causing the number of used ADCs and the decimation rate to be switched such that the product of the number of used ADCs and the decimation rate is maintained to be a constant state.

According to the present disclosure, by setting the product of the number of ADCs used and the decimation rate to be constant, the power consumption changes according to the change in the number of ADCs used while inclination of the shutter operation and the read operation constant. Therefore, power consumption can be suppressed.

Effects of the Invention

As described above, according to the present disclosure, it is possible to prevent generation of an invalid frame while suppressing power consumption.

Note that the effects described above are not necessarily limited, and, along with or in lieu of the effects described above, any of the effects described in the present Description, or another effect that can be grasped from the present Description may be exhibited.

MODE FOR CARRYING OUT THE INVENTION

Hereinafter, a preferred embodiment of the present disclosure will be described in detail with reference to the accompanying drawings. Note that in the present Description and the drawings, the same reference signs denote constituents having substantially the same functional configuration and an overlapping description will be omitted.

Note that the description will be given in the following order.
1. Technical Overview of Present Disclosure
 1.1. Example of Electronic Apparatuses to Which Technology of Present Disclosure Can Be Applied
 1.2. CMOS Image Sensor
 1.3. Background to Technology of Present Disclosure
2. Regarding Imaging Device to Which Technology of Present Disclosure Can Be Applied
 2.1. Function and Configuration
 2.2. Relationship between Vertical Decimation Rate and the Number of Used ADCs
 2.3. Example of ADC Arrangement
 2.4. Operation Flow 1. Technical Overview of Present Disclosure (1.1. Example of Electronic Apparatuses to which Technology of Present Disclosure can be Applied)

Figure 1A:
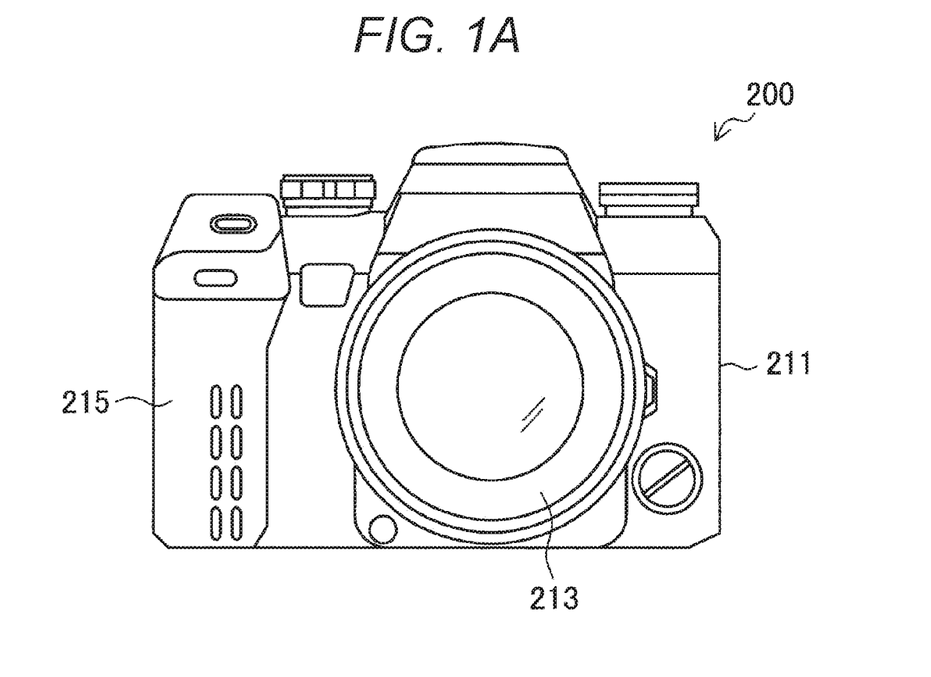
FIG. 1A is an external view illustrating an example of an electronic apparatus to which the technology of the present disclosure can be applied.
Figure 1B:
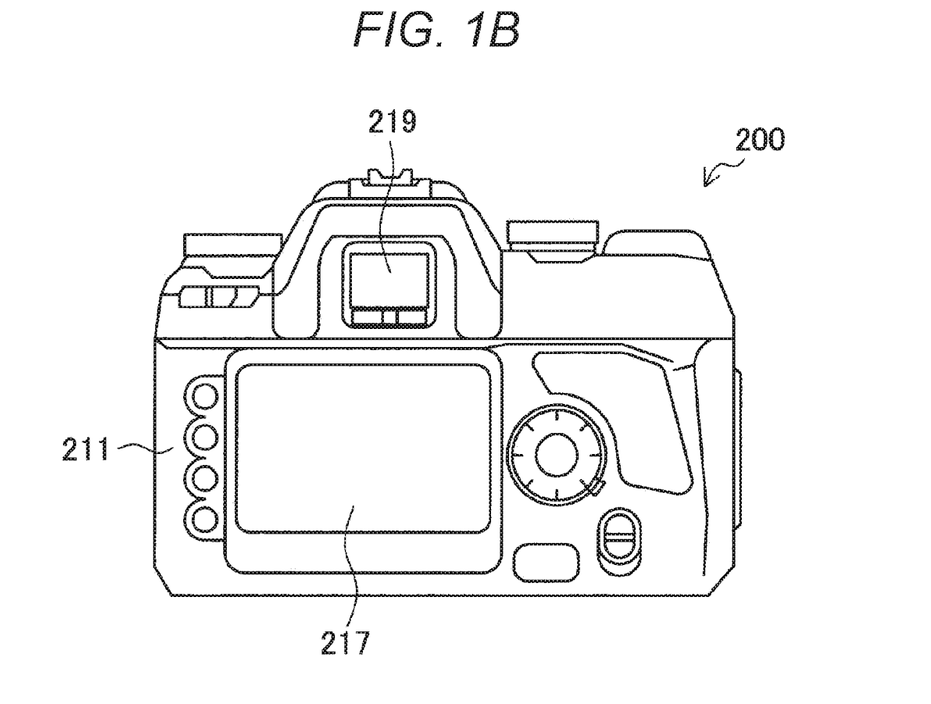
FIG. 1B is an external view illustrating an example of the electronic apparatus to which the technology of the present disclosure can be applied.

An example of the electronic apparatus to which the technology of the present disclosure is applied will be described with reference to FIGS. 1A and 1B. Each of FIGS. 1A and 1B is a view illustrating a digital camera to which the technology of the present disclosure is applied. A digital camera 200 includes a body section (camera body) 211, an interchangeable lens unit 213, a grip section 215 held by a user upon imaging, a monitor unit 217 that displays various information, and an electronic view finder (EVF) 219 that displays a through image observed by the user upon imaging. Note that FIG. 1A is an external view of the digital camera 200 viewed from the front (that is, a subject side), and FIG. 1B is an external view of the digital camera 200 viewed from the rear (that is, a photographer side).

The technology of the present disclosure is used, for example, when an image is captured with the digital camera 200, and can prevent a captured image displayed on the monitor unit 217 from being interrupted.

(1.2. CMOS Image Sensor)

First, the mechanism of a CMOS image sensor mounted on an imaging device such as the digital camera 200 will be described. The image sensor is provided with a plurality of pixels. In the image sensor, charges accumulated in each pixel are read, and a plurality of ADCs converts pixel signals that have been read from an analog format to a digital format. The pixel signals in the digital format output from the plurality of ADCs are subjected to image processing to form a captured image. The captured image obtained here is displayed on the monitor unit 217 of the digital camera 200, for example, so that the user can confirm the captured image.

In the image sensor, specifically, shutter operation of sweeping out charges accumulated in each pixel, which is a photoelectric conversion element, and read operation of reading a pixel signal accumulated in each pixel are performed. The time from the shutter operation to the read operation is the time when charges are accumulated in the pixel, and this time is called an accumulation time. Thereafter, the pixel signals read from the image sensor are converted from an analog format to a digital format by the plurality of ADCs, pixel signals in the digital format are output, and image processing is performed.

(1.3. Background to Technology of Present Disclosure)

Figure 2:
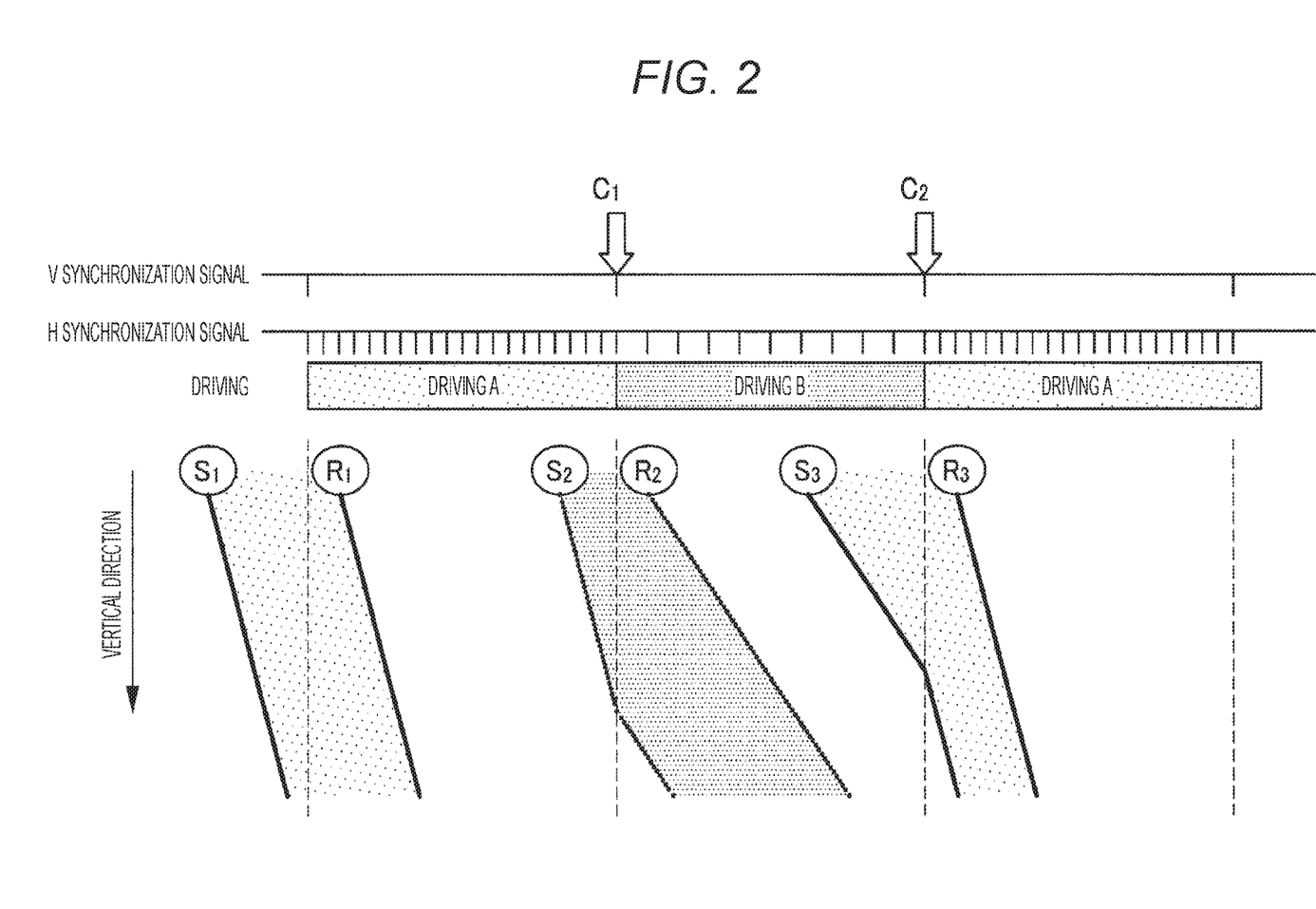
FIG. 2 is a diagram illustrating a comparative example of the technology of the present disclosure.

The technical background of the present disclosure will be described with reference to FIG. 2. FIG. 2 is a diagram illustrating a timing chart in which shutter operation S and read operation R of an image sensor according to a comparative example of the technology of the present disclosure are performed. The interval of horizontal synchronization signals is a signal that is output at a predetermined interval and that is related to operation in the horizontal direction. A vertical synchronization signal is a signal that is output at a predetermined interval and that is related to operation in the vertical direction.

For example, driving A and driving B are two states that differ from each other in shutter operation speed and read operation speed. In the driving A, the interval between horizontal synchronization signals is narrower than that in the driving B. In the driving B, the interval between horizontal synchronization signals is wider than that in the driving A. That is, the driving A takes a shorter time and the driving B takes a longer time to read the pixel signals for one frame. Then, shutter operation $S_1$ and read operation $R_1$ corresponding to the driving A have the same inclinations and maintain a constant interval from the start to the end of the operation. In this manner, the fact that inclinations of the shutter operation and the read operation are the same and maintain a constant interval means that the accumulation time of each pixel from the shutter operation $S_1$ to the read operation $R_1$ is the same in all horizontal lines of a pixel array.

FIG. 2 illustrates timing $C_1$ at which a vertical synchronization signal is output at a predetermined interval and driving is switched. The driving A is switched to the driving B at the timing $C_1$. For example, when the driving A is switched to the driving B at the timing $C_1$, in read operation $R_2$, a pixel signal is read at the read speed of the driving B. In contrast, in the shutter operation $S_2$ corresponding to the read operation $R_2$, the driving A is switched to the driving B in the middle of the shutter operation $S_2$. Therefore, the inclination of the shutter operation $S_2$ changes from the start to the end of the shutter operation.

That is, the shutter operation $S_2$ is continuously performed before and after the timing $C_1$, and when the driving A is switched to the driving B at the timing $C_1$, the shutter operation $S_2$ is changed from the shutter operation speed in the driving A to the shutter operation speed in the driving B. Therefore, the accumulation time from the shutter operation to the read operation is not constant throughout one frame. As described, a frame whose accumulation time is not constant is an invalid frame and is not used for displaying a captured image.

Next, FIG. 2 illustrates timing $C_2$ at which a further next vertical synchronization signal is output and driving is switched. The driving B is switched to the driving A at the timing $C_2$. For example, before and after the timing $C_2$, shutter operation $S_3$ is continuously performed. When the driving B is switched to the driving A at the timing $C_2$, the shutter operation $S_3$ operates at the shutter operation speed in the driving B from start of the shutter operation to the timing $C_2$, and operates at the shutter operation speed in the driving A after the timing $C_2$.

In contrast, in read operation $R_3$ in which reading is started after the driving B is switched to the driving A at the timing $C_2$, the read operation $R_3$ is performed at the read speed in the driving A. As a result, the inclinations of the shutter operation $S_3$ and the read operation $R_3$ are not constant, and a frame in which the accumulation time is not constant is generated in an image of one frame. Such a frame whose accumulation time is not constant within one frame is considered as an invalid frame and is a frame not used for displaying a captured image, similarly to when the driving A is switched from the driving B as described above.

Therefore, the inventor has conducted intensive research on a technology in which inclinations of shutter operation and read operation can be kept constant even if driving is switched. Shutter operation and read operation are performed in each driving, and the pixel signal that has been read is converted from an analog format to a digital format by an ADC and output. With this arrangement, the inventor has focused on an ADC and has conceived a technology of operating the ADC with constant inclinations of shutter operation and read operation and low power consumption.

2. Regarding Imaging Device to which Technology of Present Disclosure can be Applied (2.1. Function and Configuration)

Figure 3:
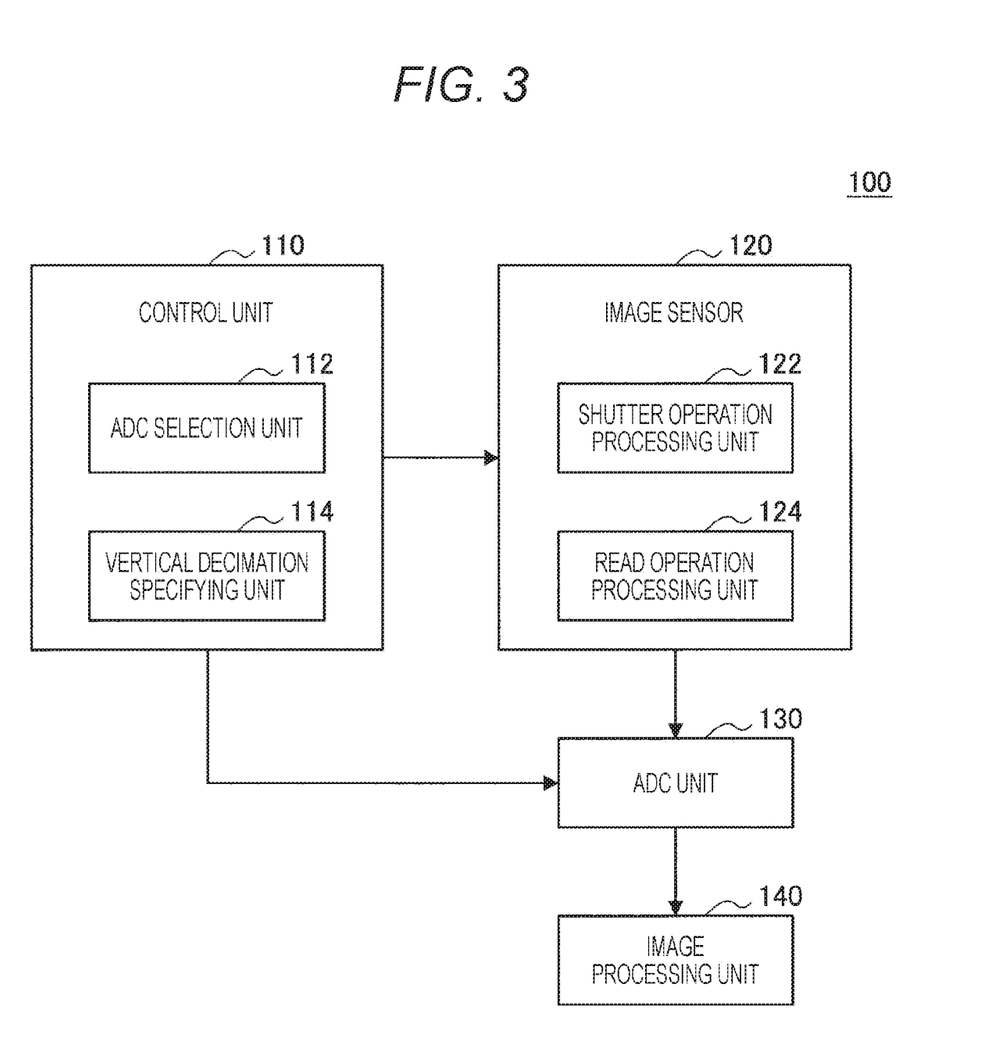
FIG. 3 is a block diagram illustrating a configuration of an imaging device according to an embodiment of the present disclosure.

With reference to FIG. 3, the function and configuration of an imaging device 100 to which the technology of the present disclosure is applied will be described. FIG. 3 is diagram which is a block diagram illustrating an example of respective configurations of the imaging device 100 to which the technology of the present disclosure is applied. The imaging device 100 includes a control unit 110, an image sensor 120, an ADC unit 130, and an image processing unit 140.

((Image Sensor))

The image sensor 120 includes a shutter operation processing unit 122 and a read operation processing unit 124. The image sensor 120 has a function of receiving light at each pixel and reading a pixel signal of each pixel. For example, the image sensor 120 includes a plurality of pixels arranged side by side in the horizontal direction and the vertical direction, and receives light of a subject for one frame of a captured image.

The shutter operation processing unit 122 has a function of receiving light of a subject in each pixel and sequentially sweeping out accumulated charges. After the shutter operation processing unit 122 has operated, each pixel newly receives light of a subject, and therefore accumulates charges. In the shutter operation processing unit 122, shutter operation is performed for each pixel arranged side by side in the horizontal and vertical directions. This shutter operation starts from a pixel arranged on the horizontal line corresponding to the uppermost stage of one frame of a captured image, and is sequentially performed to the lowermost stage in the horizontal direction.

The read operation processing unit 124 has a function of reading charges accumulated in each pixel and outputting the charges to the ADC unit 130. Similar to the shutter operation, the read operation is performed for each of the plurality of pixels arranged side by side in the horizontal and vertical directions. The read operation starts from a pixel arranged in the horizontal line corresponding to the uppermost stage of one frame of the captured image, and is sequentially performed to the lowermost stage in the horizontal direction.

((ADC Unit))

The ADC unit 130 has a function of converting a pixel signal read by the image sensor 120 from an analog format to a digital format and outputting the pixel signal to the image processing unit 140. The ADC unit includes a plurality of ADCs. The number of ADCs included in the ADC unit 130 is not limited.

(Control Unit 110)

The control unit 110 includes an ADC selection unit 112 and a vertical decimation specifying unit 114. The control unit 110 has a function of controlling the image sensor 120 and the ADC unit 130.

The control unit 110 may execute the above-described control by cooperation of software and hardware, for example. For example, the control unit 110 may include, as hardware, a central processing unit (CPU), a read only memory (ROM), and a random access memory (RAM).

The CPU functions as, for example, an arithmetic processing device or a control device, and controls the overall or part of operation of each constituent on the basis of various programs recorded in the ROM and the RAM. Note that a program that causes a computer including a CPU and the like to execute the functions described above and a storage medium that stores the program are included in the scope of the technology according to the present disclosure.

The ROM is a means for storing a program read by the CPU, data used for arithmetic operation, and the like. In the RAM, for example, a program read by the CPU and various parameters that change appropriately when the program is executed, and the like are temporarily or permanently stored.

The ADC selection unit 112 included in the control unit 110 has a function of selecting the number of ACDs used from the plurality of ADCs included in the ADC unit 130. By selecting the number of ADCs used, the ADCs used and the ADCs not used can be separated from each other. By providing ADCs that are not used, power consumption of the imaging device 100 can be suppressed.

The vertical decimation specifying unit 114 has a function of specifying a decimation rate for decimating the pixel signal read from the image sensor in the vertical direction. Here, the product of the decimation rate and the number of used ADCs is set to be constant. Therefore, the ADC selection unit 112 and the vertical decimation specifying unit 114 cooperate to specify the decimation rate and to select the number of ADCs used. Details of vertical decimation will be described later.

(2.2. Relationship Between Vertical Decimation Rate and the Number of Used ADCs)

First, vertical decimation will be described. Vertical decimation operation means that some of the horizontal lines of pixels that are arrayed are extracted and read, and pixel signals that are read are converted from an analog format to a digital format by using the ADCs and are output. An example of an RGB pixel array (Bayer array) will be described. In the RGB pixel array (Bayer array), for example, the respective pixels have color filters using R (red) G (green) B (blue) color coding, and n-rows of pixel horizontal lines having the plurality of pixels (the number of pixels is an integer of two or more) are arranged in the vertical direction.

In the Bayer array, odd rows which are GR rows and even rows which are GB rows are arranged side by side. With respect to this Bayer array, for example, in pixel signal read operation, read operation is sequentially performed for the pixel horizontal line of n rows. If the read operation for the horizontal pixel line on the nth row is completed, read operation for the (n+1)th row, which is the next row in the vertical direction, is performed in the horizontal direction. For example, after the read operation is performed for all the rows in the vertical direction, read operation regarding the next frame may be sequentially performed on the pixel horizontal line on the nth row. Reading all the rows in the vertical direction and converting pixel signals and outputting the converted pixels while reading the pixel horizontal lines can be referred to as all-pixel operation. The shutter operation is also sequentially performed similarly to the read operation.

In contrast, the vertical decimation operation is not operation of reading all the rows in the vertical direction, but is operation of skipping some of the rows arranged in the vertical direction to perform reading, adding the pixel signals of the read rows, and reading the obtained pixel signal as a pixel signal on any row so as to perform pixel signal conversion. For example, in the case of 2/3 vertical decimation, out of three GR rows on odd rows, read operation is performed for two rows, a pixel signals for one row is output, and pixel signal conversion is performed. Read operation is performed similarly for GB rows on even rows. Out of three GB rows on odd rows, read operation is performed for two rows, a pixel signal for one row is output, and pixel signal conversion is performed. The number in the denominator indicates the vertical decimation rate. For example, in 1/6 vertical decimation operation, read operation is performed for one of the six GR rows on odd rows, a pixel signal for one row is output, and pixel signal conversion is performed. By performing vertical decimation operation as described above, the time required for reading and pixel signal conversion is reduced as compared with the all-pixel operation for reading all the rows in the vertical direction.

However, as described above, the time from when the pixel signals for one frame are read and output to the ADC and until when the ADCs have converted the pixel signals from the analog format to the digital format differs between the all-pixel operation and the vertical decimation operation. If this time differs, an invalid frame will be generated. Therefore, it is required to keep the time from read operation to conversion operation in the ADCs constant.

Therefore, when the vertical decimation operation is performed, the number of ADCs used is reduced from the number of ADCs used during the all-pixel operation. Therefore, the time from read operation to conversion operation in the ADCs can be changed. In order to make inclinations of shutter operation and read operation constant, it is required to make the time from the read operation to the conversion operation in the ADCs constant by specifying the vertical decimation rate (hereinafter referred to as a decimation rate) and selecting the number of ADCs used on the basis of the decimation rate. Therefore, by switching the decimation rate and the number of used ADCs so that the product of the decimation rate and the number of used ADCs is constant, it is possible to prevent generation of an invalid frame.

(2.3. Example of ADC Arrangement)

Figure 4:
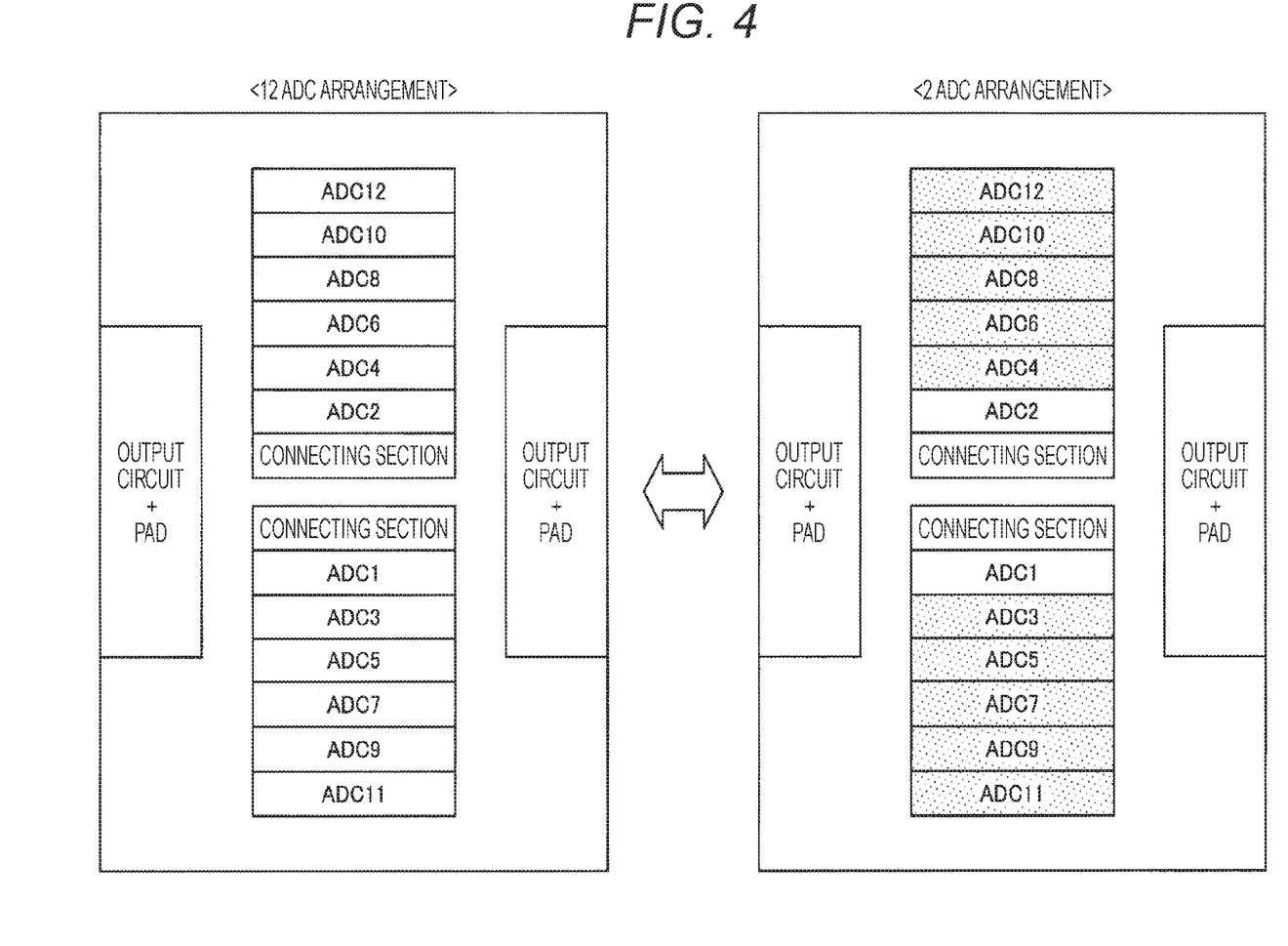
FIG. 4 is a diagram illustrating arrangement of ADCs according to the embodiment.

Here, an arrangement example of ADCs will be described with reference to FIG. 4. FIG. 4 is a diagram illustrating an example of an ADC arrangement example. In FIG. 4, a connecting section, a plurality of ADCs, an output circuit, and a PAD are arranged on a unit substrate. The connecting section has a pair of connecting sections in the center part. In the direction in which the pair of connecting sections are arranged, the plurality of ADCs is provided from the pair of connecting sections toward both sides of the unit substrate in the direction in which the pair of connecting sections are arranged. The plurality of ADCs includes a first ADC on one side and a second ADC on the other side of the pair of connecting sections, a third ADC adjacent to the first ADC, and a fourth ADC adjacent to the second ADC. Furthermore, the output circuit and the PAD are arranged at each of the both ends of the unit substrate in the direction orthogonal to the direction in which the pair of connecting sections are arranged.

An ADC arrangement example in FIG. 4 illustrates twelve ADCs arranged on the unit substrate. In this example, an arrangement example in which the number of the plurality of ADCs is twelve is illustrated; however, the number of ADCs is not limited as long as the number is two or more. Specifically, two, four, eight, twelve, or sixteen ADCs may be arranged.

According to the technology of the present disclosure, the ADC used is selected from the plurality of ADCs provided on the basis of the decimation rate. FIG. 4 illustrates a case where the number of ADCs used is twelve and a case where the number of ADCs used is two, out of the twelve ADCs that are arranged. The unhatched ADCs represent ADCs selected as used ADCs, and hatched ADCs represent unused ADCs. For example, in FIG. 4, in a case where the number of ADCs used is two, the first ADC and the second ADC that are closest to the pair of connecting sections are selected.

Note that in the ADC arrangement example illustrated in FIG. 4, the pixels are not described; however, pixels may be provided on a unit substrate on which a plurality of ADCs is provided, or pixels may be provided separately on a wafer and laminated on a unit substrate. By separately providing the pixels on the wafer, it is possible to suppress an increase in cost due to enlargement of a chip, and the like.

(2.4. Operation Flow)

Figure 5:
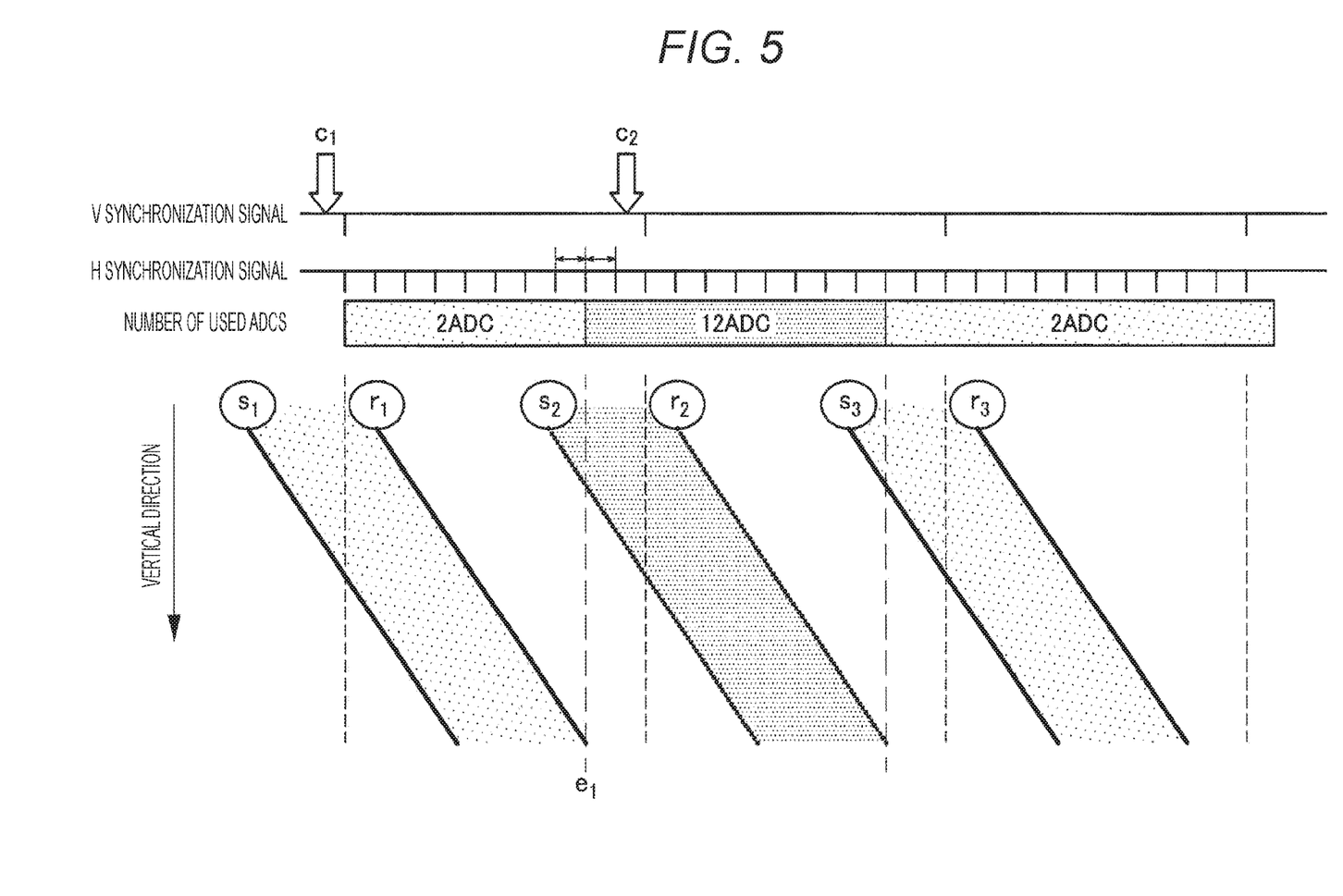
FIG. 5 is a diagram illustrating an operation flow of the imaging device according to the embodiment.

Next, the operation of switching the number of ADCs used between twelve and two will be described with reference to FIGS. 5 and 6. FIG. 5 is a diagram illustrating a timing chart of a case where the number of ADCs used is switched between twelve and two. The relationship between the number of used ADCs and the decimation rate illustrated in FIG. 5 is that the number of used ADCs is two when operation is performed at a decimation rate of 1/6, and the number of used ADCs is twelve when operation is performed at a decimation rate of 1/1.

In FIG. 5, by changing the decimation rate and the number of ADCs used, inclinations of shutter operation $s_1$, $s_2$, $s_3$ and read operation $r_1$, $r_2$, $r_3$ are constant. That is, the inclinations of the shutter operation $s_1$ and the read operation $r_1$ and the inclinations of the shutter operation $s_2$ and the read operation $r_2$ are constant. This is because the number of ADCs used is switched from two to twelve at timing $e_1$ when the decimation rate is switched from 1/6 to 1/1. In this way, by switching the decimation rate and the number of ADCs used, power consumption can be suppressed and the inclinations of the shutter operation and the read operation become constant throughout all the frames.

As illustrated in FIG. 5, the number of ADCs used is switched during the shutter operation for one frame. Regarding this switching, with reference to FIG. 6, a case where the number of ADCs used changes during the shutter operation will be described as a first ADC mode and a second ADC mode. FIG. 6 is a diagram in which a description regarding the setting for switching between the first ADC mode and the second ADC mode is added to FIG. 5. Here, similarly to FIG. 5, vertical decimation is 1/6 vertical decimation in the first ADC mode and is 1/1 vertical decimation in the second ADC mode. Furthermore, in the first ADC mode, the number of ADCs used is two, and in the second ADC mode, the number of ADCs used is twelve.

Figure 6:
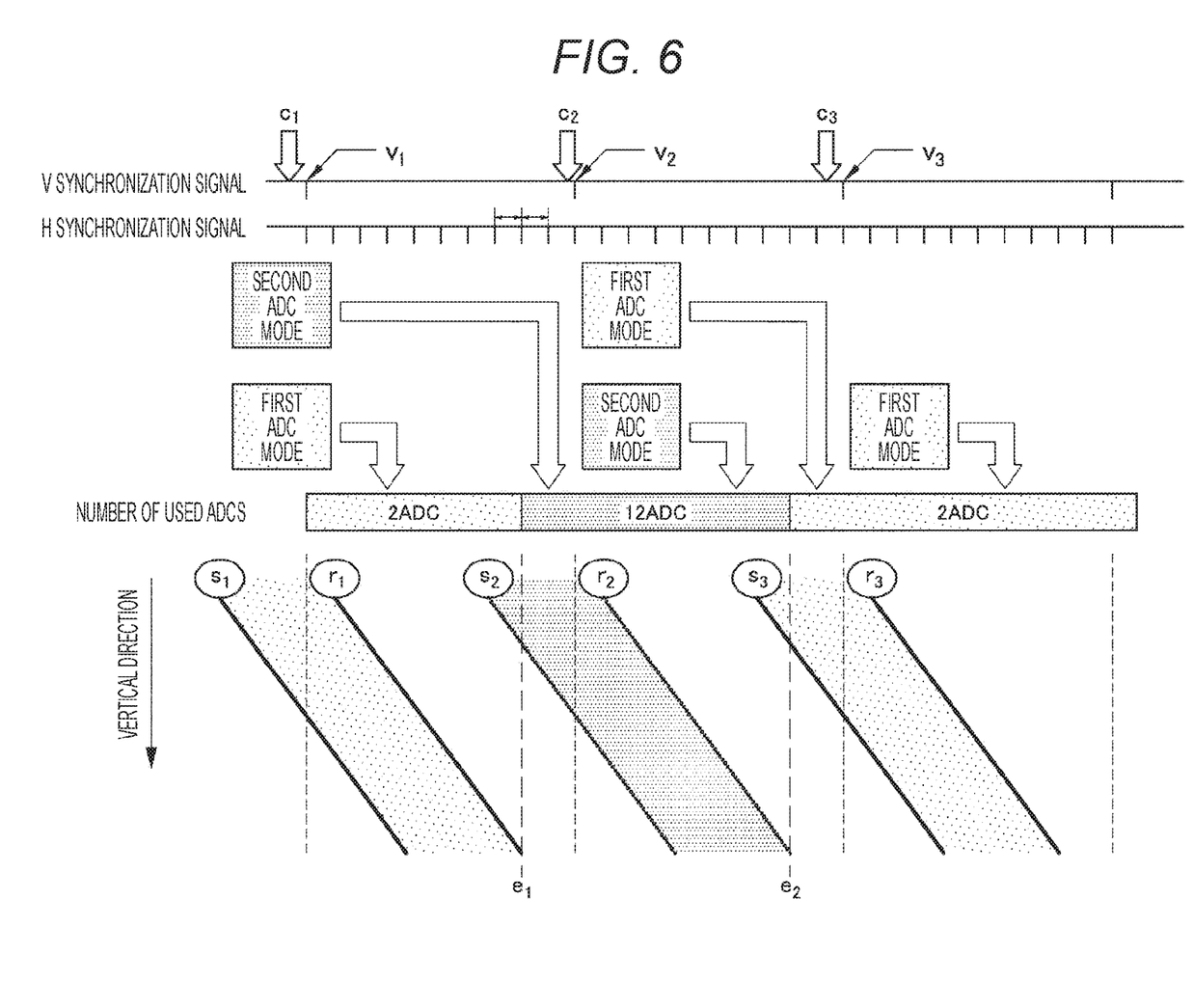
FIG. 6 is a diagram illustrating an operation flow of the imaging device according to the embodiment.

First, referring to FIG. 6, a shutter operation $s_1$ corresponding to the period from a vertical synchronization signal $v_1$ to a vertical synchronization signal $v_2$ is performed before the vertical synchronization signal $v_1$, and the shutter operation $s_1$ continues at the timing of the vertical synchronization signal $v_1$. Read operation $r_1$ is performed after the vertical synchronization signal $v_1$ and sequentially starts after predetermined accumulation time has passed from the shutter operation $s_1$.

Shutter operation $s_2$ and read operation $r_2$ corresponds to the period from a next vertical synchronization signal $v_2$ to a vertical synchronization signal $v_3$, the shutter operation $s_2$ is performed before the vertical synchronization signal $v_2$, and the shutter operation $s_2$ continues at the timing of the vertical synchronization signal $v_2$. The read operation $r_2$ is performed after the vertical synchronization signal $v_2$ and sequentially starts after predetermined accumulation time has passed from the shutter operation $s_2$.

In the technology of the present disclosure, the number of ADCs used is switched while the shutter operation $s_2$ is operating. With reference to FIG. 6, the number of ADCs used during the operation of the shutter operation $s_2$ is switched from two to twelve.

Here, the shutter operation $s_2$ is performed over the previous period and the subsequent period of the vertical synchronization signal $v_2$ and is performed in the second ADC mode. Therefore, the inclination of the shutter operation $s_2$ is constant. Since the shutter operation $s_2$ operates in the second ADC mode even in the previous period of the vertical synchronization signal $v_2$, in the technology of the present disclosure, at the time point of the vertical synchronization signal $v_1$, it is preferable to set a second register which is parameter information used in the second ADC mode, in addition to a first register which is parameter information used in the first ADC mode.

For example, in FIG. 6, the number of ADCs used is switched from two to twelve while the shutter operation $s_2$ is operating. This switching is realized by setting the first register and the second register at timing $c_1$ prior to the vertical synchronization signal $v_1$ output before the shutter operation $s_2$ starts operating. Therefore, it is possible to perform imaging without causing a problem in the imaging device 100.

Moreover, with reference to FIG. 6, the number of ADCs used is switched from twelve to two during operation of the shutter operation $s_3$.

Here, the shutter operation $s_3$ is performed over the previous period and the subsequent period of the vertical synchronization signal $v_3$ and is performed in the second ADC mode. Therefore, the inclination of the shutter operation $s_3$ is constant. Since the shutter operation $s_3$ operates in the first ADC mode even in the previous period of the vertical synchronization signal $v_3$, in the technology of the present disclosure, at the time point of the vertical synchronization signal $v_2$, it is preferable to set the first register which is parameter information used in the first ADC mode, in addition to the second register which is parameter information used in the second ADC mode.

For example, in FIG. 6, the number of ADCs used is switched from twelve to two while the shutter operation $s_3$ is operating. This switching is realized by setting the second register and the first register at timing $c_2$ prior to the vertical synchronization signal $v_2$ output before the shutter operation $s_3$ starts operating. Therefore, it is possible to perform imaging without causing a problem in the imaging device 100.

A case where the number of ADCs used is switched during the predetermined shutter operation has been described above. A case where the number of ADCs used is not switched during the predetermined shutter operation will be described. Referring to FIG. 6, there is illustrated a case where the second ADC mode is switched to the first ADC mode during operation of the shutter operation $s_3$, and the first mode continues after the switching. At this time, in the shutter operation performed next to the shutter operation $s_3$, the first ADC mode continues.

In this case, the first register, which is the parameter information used in the first ADC mode, is set before the shutter operation after the switching is performed. In FIG. 6, for example, it is preferable that the first register is set between timing $e_2$ at which switching to the first ADC mode is performed and the vertical synchronization signal $v_3$ output after the switching.

With the configuration as described above, by keeping the product of the number of ADCs used and the decimation rate constant, it is possible to reduce power consumption and prevent generation of an invalid frame when the number of ADCs used decreases while keeping the inclinations of the shutter operation and the read operation constant. By preventing an invalid frame, it is possible to suppress lowering of continuous imaging speed in an imaging device, and it is possible for the user to have an imaging experience without missing the moment when the user wants to capture an image.

While the preferred embodiments of the present disclosure have been described in detail with reference to the accompanying drawings, the technical scope of the present disclosure is not limited to such examples. It is obvious that a person skilled in the art of the present disclosure can conceive various modifications and corrections within the scope of the technical idea described in the claims, and it is naturally understood that these modifications and corrections also belong to the technical scope of the present disclosure.

For example, in the embodiment described above, the image imaging device is incorporated in the digital camera; however, the present technology is not limited to this example. For example, the present technology may be applied to a smartphone, other electronic apparatuses, and the like.

Furthermore, the effects described in the present Description are illustrative or exemplary only and are not limited. That is, the technique according to the present disclosure can exhibit other effects that are apparent to those skilled in the art from the description of the present Description in addition to or in lieu of the effects described above.

REFERENCE SIGNS LIST

100 Imaging device
110 Control unit
112 ADC selection unit
114 Vertical decimation specifying unit
120 Image sensor
122 Shutter operation processing unit
124 Read operation processing unit
130 ADC unit
140 Image processing unit

The invention claimed is:

1. An image processing device, comprising:
a processor configured to:
convert, by a plurality of Analog-to-Digital Converters (ADCs), a pixel signal read from an image sensor from an analog format to a digital format;
select a number of used ADCs among the plurality of ADCs based on a decimation rate of pixels in the pixel signal from the image sensor; and
switch the number of used ADCs and the decimation rate such that a product of the number of used ADCs and the decimation rate is in a constant state.

2. The image processing device according to claim 1, wherein
the processor is further configured to:
perform shutter operation, in the image sensor, to sweep out the pixel signal accumulated and read operation to read the pixel signal accumulated for each frame of an image; and
set a first register and a second register prior to the shutter operation, wherein
the first register is first parameter information associated with a first ADC mode,
the second register is second parameter information associated with a second ADC mode, and
the first ADC mode and the second ADC mode are different in the number of used ADCs and the decimation rate.

3. The image processing device according to claim 2, wherein
the first register and the second register are set before a vertical synchronization signal prior to start of the shutter operation, and
the vertical synchronization signal is a signal for which switching between the first ADC mode and the second ADC mode is performed.

4. An image processing method, comprising:
converting, by a processor, a pixel signal read from an image sensor from an analog format to a digital format based on a plurality of Analog-to-Digital Converters (ADCs);
selecting, by the processor, a number of used ADCs among the plurality of ADCs based on a decimation rate of pixels in reading the pixel signal from the image sensor; and
switching the number of used ADCs and the decimation rate such that a product of the number of used ADCs and the decimation rate is in a constant state.

5. A non-transitory computer-readable medium having stored thereon, computer-executable instructions which, when executed by an image processing device, cause the image processing device to execute operations, the operations comprising:
converting, by a plurality of Analog-to-Digital Converters (ADCs), a pixel signal read from an image sensor from an analog format to a digital format;
selecting a number of used ADCs among the plurality of ADCs based on a decimation rate of pixels in reading the pixel signal from the image sensor; and
switching the number of used ADCs and the decimation rate such that a product of the number of used ADCs and the decimation rate is in a constant state.

* * * * *